United States Patent [19]
Racz

[11] 3,934,748
[45] Jan. 27, 1976

[54] COOKWARE CONTAINERS

[76] Inventor: Nick S. Racz, 25 Old Creek Road, Palos Park, Ill. 60464

[22] Filed: Aug. 19, 1974

[21] Appl. No.: 498,309

Related U.S. Application Data

[63] Continuation of Ser. No. 242,325, April 10, 1972, abandoned.

[52] U.S. Cl. .............. 220/9 R; 220/17; 220/63 R; 220/64; 220/68; 220/94 R
[51] Int. Cl.² ............... B65D 25/18; B65D 25/14; B65D 25/34
[58] Field of Search ........ 220/9 R, 63, 64, 17, 94 R, 220/68, 13, 63 R; 117/126 R, 126 GB, 132 CF

[56] References Cited
UNITED STATES PATENTS

| | | | |
|---|---|---|---|
| 1,459,023 | 6/1923 | Guest | 215/12 R |
| 1,493,459 | 5/1924 | Jancikin | 220/13 |
| 1,752,584 | 4/1930 | Biette | 220/13 |
| 2,128,341 | 8/1938 | Falkind | 229/34 R |
| 2,139,598 | 12/1938 | McMullen | 220/13 |
| 2,442,454 | 6/1948 | Bodell | 220/94 R |
| 2,494,266 | 1/1950 | Scavallo | 220/64 |
| 2,540,306 | 2/1951 | Turek | 220/94 R |
| 2,766,971 | 10/1956 | Vance et al. | 220/17 |
| 2,777,783 | 1/1957 | Welch | 117/132 CF |
| 3,143,241 | 8/1964 | Howell | 220/64 |

FOREIGN PATENTS OR APPLICATIONS 528,726  12/1929  Germany .......... 220/63 R

*Primary Examiner*—William Price
*Assistant Examiner*—Allan N. Shoap
*Attorney, Agent, or Firm*—Molinare, Allegretti, Newitt & Witcoff

[57] ABSTRACT

The container of a cookware unit includes a cartridge member and a replaceable infix member, both of which are of substantially the same configuration and in which the infix member is removably positioned in the cavity of the cartridge member. A non-stick coating coats the interior of the infix member and the infix and cartridge members are removably fastened together into an integral unit. Heat diffusion means may also be located between the cartridge and the infix member to distribute the heat which is applied to the container.

28 Claims, 7 Drawing Figures

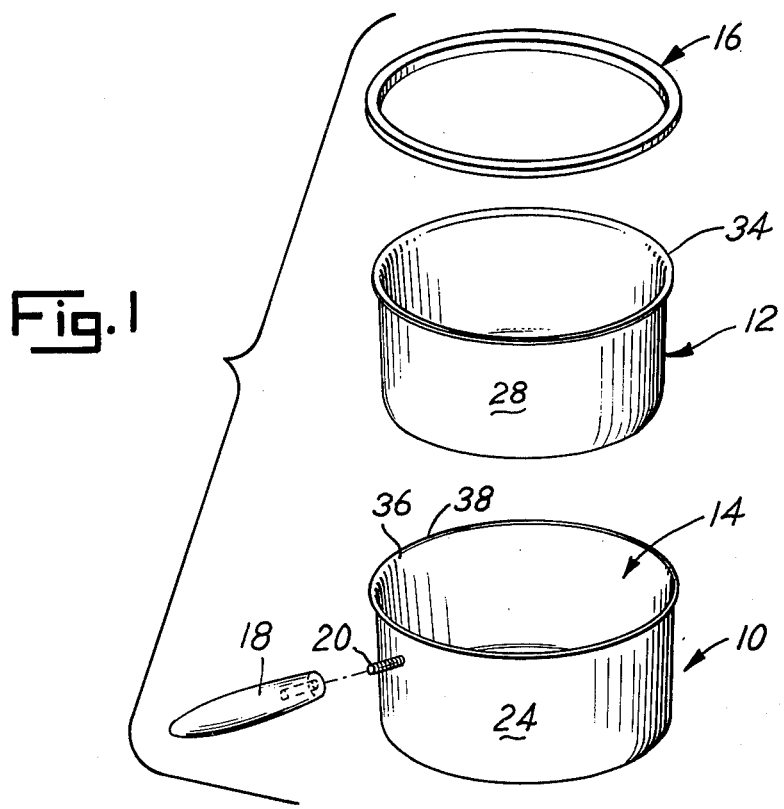
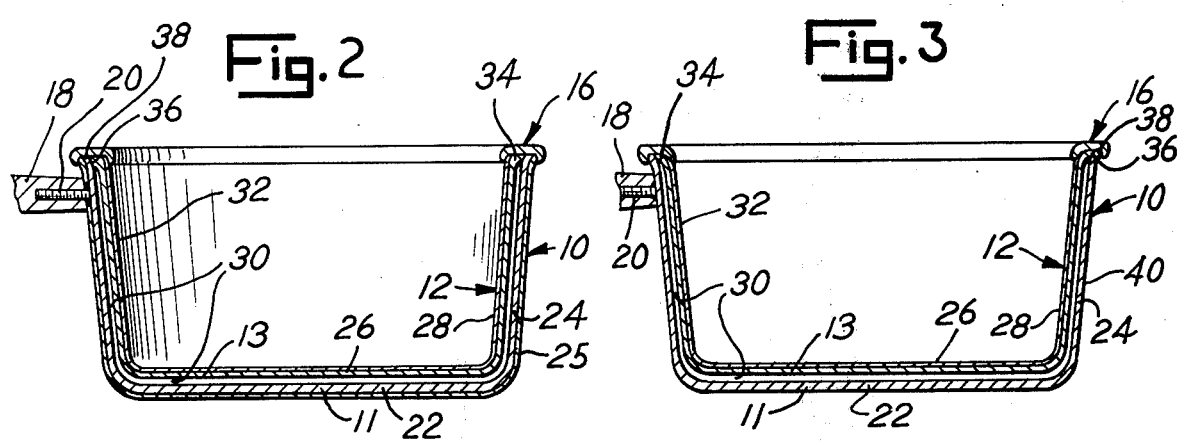
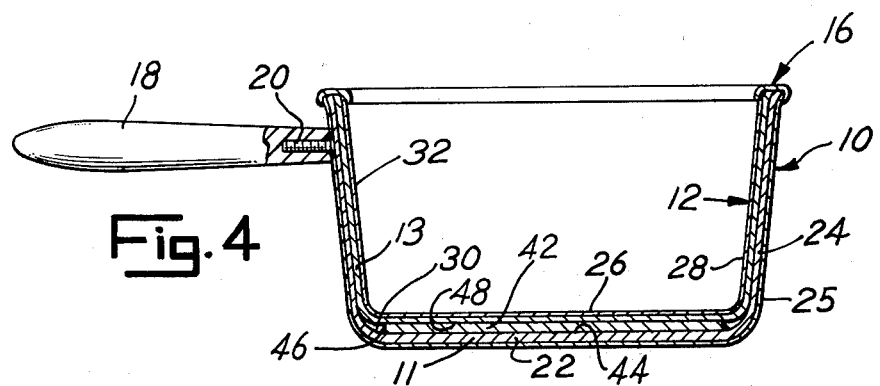

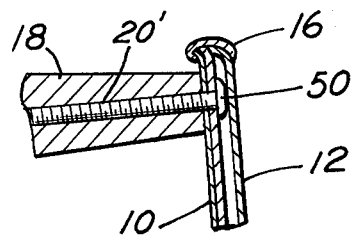
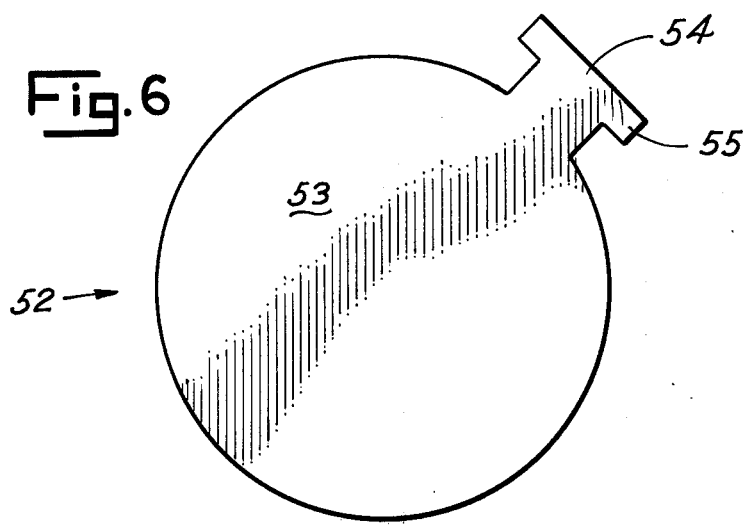
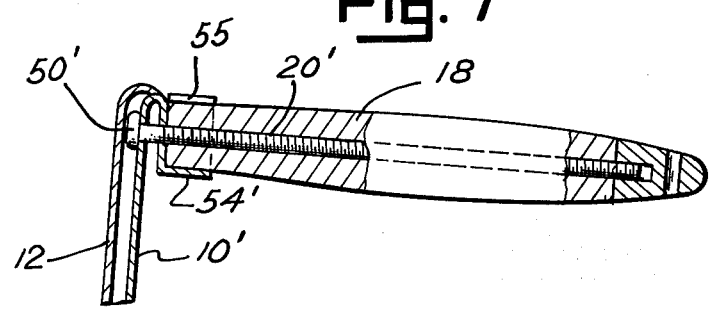

COOKWARE CONTAINERS

This is a continuation of application Ser. No. 242,325, filed Apr. 10, 1972, now abandoned.

BACKGROUND AND SUMMARY OF THE INVENTION

A cookware unit may be employed as any one or all of the following: for heating, cooling, storing, serving and/or transporting food contents. Cookware units are generally composed of a container, with or without handle, the protective non-stick or decorative coatings of the container, the closure of the container and the coatings of the closure. According to the present state of art, the handle of the container, the closure of the cookware unit and the entire container with all its coatings must generally be discarded when any one of them has deteriorated or has been damaged, particularly where the container is part of a matched set which has been discontinued.

The most vulnerable, the most short lived and most expensive coating of the cookware unit is the interior non-stick coating of the container. Due to the inherent limitations of non-stick coating materials in their resistance to wear, their life is normally limited to approximately 2 to 3 years. The container itself, however, which is usually formed of strong metals, has the potential to serve a user for his entire lifetime. Nevertheless, the present state of art necessitates the replacement of the entire container each time its non-stick coating is damaged or reaches the end of its useful life. This invention relates to a cookware unit, and more particularly, a container of a cookware unit having a replaceable infix or insert member.

Cookware containers having non-stick coatings, such as PTFE, are well known in the cookware field. Such containers are generally formed of solid aluminum and the interior aluminum surface which contacts the food to be prepared is coated with a suitable non-stick coating. Prior to the application of the non-stick coating, the aluminum surface of these containers must first be prepared by suitable methods in order to insure adequate adhesion between the non-stick coating and the aluminum. Such methods include etching, either chemically or mechanically, or the application of a sintered ceramic anchor frit which is heat bonded to the aluminum and to which, in turn, the non-stick coating is bonded. Either where the aluminum is etched or where the sinter bonded anchor frit is applied, the thickness of the aluminum must be substantially increased relative to the thickness which would otherwise be satisfactory where non-stick coatings are not employed. If the aluminum is etched, the increased thickness is necessary to insure that adequate container strength remains after the extensive metal erosion attendant to the etching. On the other hand, where a heat bonded anchor frit is employed, the container thickness must also be increased to compensate for the loss of strength which results from the annealing of the aluminum which occurs when the container is raised to the temperatures necessary to bond such anchor frits to the metal substrate, these temperatures frequently being in excess of 1000°F.

In my copending United States application for Letters Patent, Ser. No. 3,044, filed Jan. 15, 1970 now U.S. Pat. No. 3,788,513, a laminated cookware construction is disclosed in which heat bonded anchor frits and non-stick coatings may be employed while actually realizing a decrease in the amount of relatively expensive aluminum necessary in such non-stick cookware containers from that previously required. Similarly to the invention disclosed in the aforementioned application, the present invention also has as an important object, the substantial reduction in the amount of relatively expensive aluminum materials in non-stick cookware containers, either in the container as initially purchased by the consumer, in the consumption of aluminum over the cooking lifetime of the consumer, or both.

In the present invention, a removable and replaceable infix or insert member is provided which may be readily replaced when the non-stick coating has deteriorated after its normal useful life of 2 to 3 years, rather than necessitating disposal of the entire container at that time as in the past. The infix member of the invention is not relied upon to provide any substantial amount of the requisite strength of the container and, thereby the relatively expensive aluminum from which the infix member is formed may be substantially reduced in thickness and quantity. The principal requirement of the infix member and its composition is that it be a compatible substrate for the bonding of the non-stick coating, e.g. aluminum and PTFE respectively. In turn, a permanent, highly durable exterior cartridge or shell member, into which the infix member is positioned during use, is relied upon to provide in predominant measure the structural and thermal prerequisites of the container and its aesthetic appearance. This cartridge member is constructed so as to be highly durable and to last the lifetime of the consumer and be rechargeable with a new infix member once the non-stick performance of the coating has deteriorated to an unacceptable level.

Thus, the initial expense to the consumer of the cookware container of the present invention may be substantially reduced by the use of a ferrous metal, such as carbon steel, in the cartridge member, the latter material being relatively inexpensive compared to aluminum. Moreover, such ferrous steels not only are relatively inexpensive, but also display several advantages over aluminum, including strength, resistance to high temperatures and weldability to mention a few, and also are compatible for use with well known decorative and protective coatings, such that the resulting cartridge is extremely durable and attractive. Even if the exterior cartridge or shell member or the closure of the cookware unit is formed of a more expensive material than carbon steel, such as aluminum, metal laminates, or stainless steel, the consumer will still realize a substantial saving over his cooking lifetime, since only the thin infix member need be discarded and replaced upon deterioration of its non-stick coating, rather than the entire cookware container as in the present state of the art.

In passing, it should be noted that any reduction in the intial fabrication cost of a cookware unit results in a substantial reduction in the ultimate initial purchase price to the consumer. This becomes particularly evident when it is considered that the retail consumer not only must bear the initial cost of fabrication of the product, but also the substantial overhead and the markup throughout the fabricating, marketing and advertising levels, as well as the sales level, both wholesale and retail. Since these markups, which must cover the overhead and profit throughout the commercial chain are based upon a given percentage of respective costs, any saving realized in the fabrication of the product will usually be substantially compounded by the time the product reaches the consumer.

In addition to the savings in material expenses afforded by the separability features of the container of the present invention, such separability also renders possible the performance of certain processing steps performed upon the respective components of the container, which can not otherwise readily be performed on containers of the present state of the art without probable adverse effects.

The handle of cookware containers can not be attached directly to the container, since the thermal expansion and contraction of the handle during use will loosen the seal between the interior side wall and the head of the handle fastener and result in leakage. However, in the present invention, the handle may be directly affixed to the cartridge without studs or other auxiliary connections. Leakage will not develop since the head of the handle fastener may be positioned between the interior of the cartridge and the exterior of the infix member in an area which is not exposed to contact with the food content. Also if spot welding is to be performed upon a conventional container, such as in the affixation of the handle, such welding would raise the temperature of any previously applied non-stick coating to a level at which this coating would decompose. Moreover, if the handle is riveted to conventional non-stick utensils, the metallic head of the rivet will be exposed to the food directly and caking will occur on these heads which necessitates abrasive action for removal. Such abrasion accelerates the deterioration and frequently damages the non-stick coating in the vicinity of the rivet heads and thus renders the container unsuitable for non-stick use in a short time. If cleaning of rivet heads with metallic or other abrasive means is not performed, the food components which settle between the rivet head and the non-stick coating may result in objectionable odors, inconvenience, and under extreme conditions, health hazards. In contrast to these shortcomings, the handle of the cookware unit of my invention may be riveted or bolted to the cartridge of the container without risk of damage to the non-stick coating from cleaning because the infix member of the container prevents the food content from contacting the rivet or bolt heads and prevents leakage due to thermal deformation of the handle. Moreover, since the infix insert and cartridge member of the present invention are separable, welding may be readily performed upon the exterior of the cartridge shell in the absence of the infix member without risk of damage to the non-stick coating of the infix member.

In conventional cookware containers, the handles are usually formed of a heat insulative organic composition, such as a phenolic resin or wood, in order to prevent burns while handling the container. Since such materials are somewhat combustible, and in any event subject to decomposition from flame impingement, flame protection of the handle has frequently been provided in the form of a separate ferrule or the like which is fitted over the end of the handle adjacent the container. In the cookware unit of the present invention, the flame protection component may be formed as an integral part of the container eliminating the need for expensive, separate components for this purpose. Moreover, integration of the flame protector with the container is facilitated by the novel infix member construction of the present invention which provides a smooth continuous container rim.

Also, in the present state of art, stainless steel and its laminates are known to offer certain advantages in hygiene, cleanability and aesthetic appearance when employed in a cookware unit. Nevertheless, stainless steel and its laminates are poor heat conductors and thus facilitate the excessive accumulation of heat which tends to burn and cake the food. In order to prevent this, most stainless steel cookware containers include a heat dissipating bottom exterior. Such bottom exterior may be copper or aluminum which may be welded, soldered, electrolytically coated or deposited by other known means onto the exterior of the container bottom. Thus, great care and expense are involved in maintaining a suitable aesthetic appearance of the cookware in view of this visible addition to the bottom. Also added fabricating costs and care are necessary to insure the cleanability of this exterior bottom addition which is not only in direct contact with flame, but also is exposed to contamination by overflowing food and water and various detergents in the sink or dishwashing machine. Moreover, detergents which may be compatible with stainless steel may not always be compatible with copper and aluminum and any recess or crevice in the attachment of the exterior bottom addition impedes the cleanability of such utensil. In contrast, the container of the present invention permits the incorporation of an interior member to facilitate heat dissipation in the container bottom and to prevent the thermal deformation or buckling of the container bottom due to repeated expansion and contraction from repeated heating and cooling. The buckling of the container bottom is particularly detrimental to heat transfer where a hot plate is the heat source, since hot plate cooking is convenient and effective only so long as the bottom of the cookware is flat so as to maximize contact with the hot plate, heat transfer being primarily effected by conduction in such hot plates. However, deformation or buckling of the bottom of the utensil will result in air gaps between the hot plate and the container and thus reduce the effectiveness and economy of heat transfer. The likelihood of such buckling or deformation will be substantially reduced in the present invention, since an inexpensive carbon steel member may be placed in the interior bottom of the cartridge member. Since the interior of the cartridge is never exposed to food, the method of placement of this member need not take into account cleanability. Also, since the bottom member is placed in the interior of the cartridge member, it will not be visible and the aesthetic appearance of the container will not be impaired. It is evident that both of these factors will reduce the labor cost of fabrication, in addition to the saving realized by the use of inexpensive carbon steel, rather than expensive copper or aluminum.

Finally, since the cartridge and infix members are formed as separate components, they may also be constructed such that they are spaced somewhat from each other in the finally assembled cookware container, thereby readily diffusing the heat which flows through the container to prevent hot spotting and/or loss of heat from the food being prepared through the side walls of the container, as well as thermal deformation of the container.

In summary, a cookware unit constructed in accordance with the principles of the invention renders possible the realization of at least several or all of the following advantages.

The performance of one or more highly desirable or economical fabricating steps upon either the cartridge shell or infix insert or closure member by themselves which could not be otherwise readily performed on prior cookware, may be readily performed on the cookware unit and on its individual members of the present invention.

A substantial reduction is realized in the cookware unit of the present invention in the usage of expensive materials, such as aluminum, stainless steel, laminates thereof, etc., and in expense to the consumer over the prior non-stick cookware containers, either or both in the initial manufacture or during the consumer's lifetime.

Enhanced welding and riveting qualities and integral affixation and flame protection of handles are realized in the present invention.

Pollution due to metal scrap waste, handles, closures and packaging therefor is substantially reduced, since when practicing the principles of the present invention, only the thin infix insert will become scrap and not the entire cookware unit, as in the past.

The container constructed in accordance with the principles of the present invention is capable of an aesthetic pleasing appearance, even though the usage of expensive materials is substantially reduced.

The infix or insert member of the present invention may be replaced either by the individual consumer or by a service facility, as desired.

The thermal performance of a container constructed in accordance with the principles of the present invention is substantially improved thereby effecting a substantial reduction in the possibility of hot spotting in that portion of the container which is to be exposed to the heat source. Such hot spotting might result in decomposition of the non-stick coating which, in turn, would cause destruction of the coating and the generation of potentially toxic vapors. The thermal performance of the container also substantially reduces the likelihood of burning-on of the food which is to be prepared in the container, the latter of which is not only undesirable from the standpoint of damage to the food being cooked, but also generally necessitates the scraping of the container to remove the burned food and consequent damage to the non-stick coating.

Due to the improved thermal performance of the cookware container incorporating the principles of the present invention, the likelihood of thermal deformation between the bottom and side walls of the cookware container is also substantially reduced. Such deformation generally occurs as the result of undesirable temperature gredients which result from unequal conduction through the container walls so as to cause buckling of the side walls and/or bottom walls of the container. Such buckling is not only undesirable from an aesthetic standpoint, but also, where the container is to be employed on a hot plate heat source where the transmission of heat to the container from the heat source depends primarily upon conduction, such deformation will result in inefficient heat transfer.

Moreover, the improved thermal performance of the container of the present invention may be realized without employing thick expensive materials of construction or cladding and plating manufacturing techniques as in the past.

In a principal aspect of the invention, a cookware unit constructed in accordance with the principles of the present invention includes heat conductive cartridge means and infix means, both of which are of a substantially predetermined configuration and which define cavities therein. The infix means is removably positioned in the cavity of the cartridge means and an easily cleaned coating is provided on the infix means. Fastening means removably attaches the cartridge means and the infix means together into an integral container.

These and other objects, features and advantages of the present invention will be more clearly understood from a consideration of the following detailed description.

BRIEF DESCRIPTION OF THE DRAWINGS

In the course of this description, reference will frequently be made to the attached drawing in which:

FIG. 1 is an exploded view of a preferred embodiment of cookware container constructed in accordance with the principles of the invention;

FIG. 2 is a cross-sectioned elevation view of a preferred embodiment of assembled cookware container of the present invention and in which the exterior of the container is coated with a decorative aesthetic coating;

FIG. 3 is a cross-sectioned elevation view of another preferred embodiment of cookware container of the invention similar to the container shown in FIG. 2, but in which the exterior cartridge member is formed of a material capable of being processed, without a coating, to provide a decorative aesthetic appearance itself;

FIG. 4 is a cross-sectioned elevation view of still another preferred embodiment of cookware container of the present invention including a heat diffusing strengthening plate therein;

FIG. 5 is a cross sectioned elevation view of a preferred embodiment of cookware container of the present invention in which the handle is affixed by a bolt or rivet;

FIG. 6 is a plan view of a container cartridge blank before forming showing a portion of the blank which is to be formed into an integral flame protector; and FIG. 7 is a cross sectioned elevation view of a container in which the flame protector has been formed.

DETAILED DESCRIPTION OF THE PREFERRED EMBODIMENTS

Referring to FIG. 1, a cookware container is shown which is constructed in accordance with the principles of the present invention. The container generally comprises a cartridge or shell member 10, an infix or insert member 12 which is receivable in the cavity 14 of the cartridge member and is shaped of similar configuration as that of the cartridge member, and a fastening member 16 which may be affixed over the top edge of members 10 and 12 to fasten them together for use by the consumer, but yet be removed to enable replacement of the infix member 12. In addition, a handle 18 may be provided for the container which is affixed to the exterior of the cartridge member 10 by way of a suitable stud 20.

Specifically, referring to FIGS. 1 and 2, the cartridge member 10 includes walls 11 which are preferably formed of a ferrous, relatively inexpensive, strong metal, such as carbon steel. These walls 11 include a substantially flat bottom wall 22 and an upstanding side wall 24 which extends upward from the bottom wall and which may be formed, as by stamping, in an integral one piece construction. The strength of the cartridge member 10 is substantial, this member providing the structural strength of the container of the present invention.

Since ferrous metals are generally subject to rust and corrosion during use, the ferrous metal should be such that it is readily compatible with suitable durable permanent and aesthetically pleasing exterior coatings, such as various high temperature sintered porcelain enamels. Such decorative and protective coating 25 covers the exterior surface of the cartridge member 10. Suitable decorative exterior coatings are not specifically enumerated herein since they are well known and well within the selection of one of ordinary skill in the art. Although carbon steel is generally preferred in the construction of the cartridge member 10 other materials both metallic and non-metallic may be employed, such as ceramics, if desired.

The handle stud 20 is also preferably formed of a ferrous metal. Thereby it may be readily affixed to cartridge member 10 by well known and superior welding techniques to the exterior of the container. Since both the stud 20 and the cartridge walls 11 are formed of ferrous materials in the preferred form of the invention, a weld substantially superior to stud welds is realized, with the attendant increase in durability and safety to the container user over the previous aluminum welded studs which were subject to breaking during use and the possibility of scalding of the user. This stud 20 may be suitably threaded or the like for attachment of the container handle 18 which, in turn, may be formed of a suitable heat insulative material.

Again referring to FIG. 2, the walls 13 of the infix or insert member 12 are preferably formed of aluminum and also include a bottom wall 26 and an upstanding side wall 28 extending upward from the bottom wall. Again the basic infix member 12 may be formed by well known stamping methods or the like and in one piece form. The configuration of the infix member 12 is preferably substantially the same as that of the cartridge shell member. In this embodiment, however, the diameter and the height of the infix member 12 are preferably slightly less than that of the cavity 14 of the cartridge member 10, such that when the infix member is positioned in the cartridge member, a slight space or gap 30 obtains between the walls of the infix member and the cartridge member. This gap 30 renders removal of the infix member easier and substantially improves the thermal performance of the container as will be explained in further detail later.

Again although aluminum is preferred as a construction material for the infix member 12, other materials, both metallic or non-metallic, may be employed in the construction of the infix member, so long as the material is sufficiently stable at high temperatures and is compatible with non-stick coatings. For example, the infix member might be constructed of fiber glass.

The interior surfaces of the infix member walls 13, the surfaces which define the cavity in which the food is to be received for preparation, are coated with a suitable non-stick coating 32 bonded thereto. This coating 32 for example, may comprise PTFE or other suitable fluorinated hydrocarbons which have been widely employed in the past in such non-stick coating applications. Thus, the infix member is preferably formed of aluminum or other material which is highly compatible with such fluorinated hydrocarbon coatings. Also as in the past, the non-stick coating may be applied either directly to the aluminum walls of the infix member after the aluminum surfaces which are to be coated have been prepared either by well known blasting or etching techniques, or may be applied to a previously applied suitable sintered anchor frit.

At this point, attention is called to the fact that the thickness of the walls 13 of the infix member 12 may be and preferably is substantially reduced, since the infix member is looked to primarily only for its non-stick coating substrate qualities and not for the strength of the container. The strength of the container of the present invention is principally provided by the cartridge member 10. Thus, whether the surface is aluminum which is prepared for receipt of the non-stick coating either by etching or by sintering at high temperatures, the affect of these surface preparation operations upon the strength of the infix member is not important.

The infix member 12 is also preferably provided with a slightly flanged outwardly extending top rim 34 which is adapted to accurately mesh with the internal surface 36 of a corresponding top rim 38 of the cartridge member. These meshing rims 34 and 38 both position the infix member 12 in spaced relationship to the cartridge member 10 so as to define gap 30 and prevent entry of food particles and other contaminants into the gap 30.

The fastening member 16 preferably comprises a ring which fits over the rims 34 and 38 of the infix member and cartridge member as shown in FIGS. 1 and 2 when the former has been positioned in cavity 14 of the latter. This ring 16 not only presents a pleasing finished appearance to the container, but also further prevents the inadvertent introduction of food particles and liquids into gap 30 either during cleaning or use. Most important, ring 16 removably fastens the cartridge member 10 and infix member 12 together into an integral cookware container unit during cleaning use and storage in the kitchen. The fastening ring 16 may be removably attached to the container by any one of several suitable methods, such as by screwing onto the top of the container, pressing thereon or a suitable adhesive bond. It will be understood that the method of attachment of the ring to the container will depend to some extent upon whether the infix member is to be replaceable by the consumer or by a service facility. If designed to be replaced by the consumer, the ring 16 will preferably be readily removable without the need for elaborate special tools.

As previously mentioned, the cartridge member 10 and infix member 12 are preferably spaced from each other so as to define a gap 30 therebetween. As shown in FIG. 2, this gap is present between both the upstanding side walls 24 and 28 and the bottom walls 22 and 26 of the respective members and is preferably slighly greater in thickness between the bottom walls than between the side walls. Gap 30 effects several important functions. In the first instance, the gap 30 facilitates withdrawal and insertion of the infix member 12 into the cartridge cavity 14 without the use of elaborate apparatus, such as vacuum forming equipment and the like. In the second instance, the gap 30 provides substantial heat diffusion which not only prevents hot spots in the bottom wall of the infix member 12 such as might otherwise result in decomposition of the non-stick coating 32 and/or the burning-on of the foods which are being prepared in the container, but also enables the ready diffusion of heat from the bottom walls to the side walls of the container to substantially reduce the likelihood of thermal deformation in both the bottom and side walls. In addition, the gap 30 also tends to insulate the container side walls so as to substantially reduce heat loss from the food through these side walls. The gap 30 may either be evacuated or may be filled with a gas, such as air or an inert gas.

The embodiment shown in FIG. 3 is substantially identical to that shown in FIG. 2 and, accordingly, like reference numerals will be employed to designate like components. The principal difference between the embodiment shown in FIG. 3 and that shown in FIG. 2 is that the material from which the cartridge member is formed in FIG. 3 is a material which itself is capable of being processed to a durable, long lasting decorative finish such as the polished exterior surface 40. Such materials for example, may include a heavy gauge aluminum or stainless steel, both of which are readily adaptable to polishing techniques and both of which are corrosion resistant.

Again the embodiment shown in FIG. 4 is substantially identical to that shown in FIG. 2, except for the provision of a plate 42 in the gap 30 between the bottom walls 22 and 26 of the cartridge and infix members 10 and 12 and the absence of the gap between the side walls 24 and 28 of these respective members. Accordingly, again like reference numerals will be employed with like components.

In the embodiment shown in FIG. 4, the plate 42 is of substantial mass and of substantially the same shape and circumferential size as the bottom walls of the respective cartridge and infix members. The plate 42 is preferably permanently fixed to the upper surface 44 of the bottom wall 22 of the cartridge member 10, as by welds 46. This plate is also preferably formed of carbon steel and thereby is suceptible to well known and superior welding techniques. The lower surface 48 of the bottom wall 26 of the infix member also preferably rests upon and is supported by the upper surface of the plate 42 as shown in FIG. 4.

Due to its relatively large mass, the plate 42 provides an extremely effective heat diffusion means for diffusing the heat furnished by the heat source through the bottom walls of the container to prevent hot spots. In addition, the plate 42 substantially strengthens the overall container and particularly the bottom wall thereof. This is particularly advantageous since, as previously mentioned, the bottom wall 26 of the infix member 12 does not display substantial strength properties. Finally, and in addition to its hot spot prevention qualities, plate 42 also diffuses the heat toward the side walls of the container, reducing the likelihood of thermal deformation in the container.

By way of example, the following dimensions may be employed in the construction of a one quart sauce pan constructed in accordance with the preceding description of the invention:

| | |
|---|---|
| cartridge shell bottom metal thickness | — 0.95–1 mm, carbon steel |
| (The side walls may be a minimum of 25% thinner than the bottom wall thickness) | |
| infix insert metal thickness | — 0.3–0.5 mm, aluminum |
| non-stick coating | — 25–30 microns, PTFE |
| decorative enamel coating | — 75–100 microns, porcelain enamel |

For larger sauce pans, e.g. 5 quart, and fry pans the bottom walls of the cartridge member would be preferably slightly thicker than the above-mentioned thickness — on the order of 1.3 mm thickness.

Also by way of example and in comparison to the above dimensions, present aluminum cookware container thicknesses are as follows:

| | | |
|---|---|---|
| Non-non stick fry pans | — | 1.2–1.6 mm |
| PTFE coated and enamelled fry pans | — | 2.6 mm |
| Electric fry pans | — | 3.2 mm |
| Cookware container to be employed on hot plate heat sources | — | 4.6 mm |

It will be seen that the thickness and quantity of aluminum in the infix member 12 of the present invention is substantially reduced over that necessary in present cookware containers, such reduction being an important feature of the present invention.

Referring to FIG. 5, an embodiment of container is shown in which the handle 18 is attached by way of a rivet or bolt 20'. It will be seen that the head 50 of the rivet 20' is easily received in the gap 30 between the upstanding walls of the cartridge member 10 and infix member 12 such that the head will not be exposed during use.

Finally, referring to FIGS. 6 and 7, a typical blank 52 is shown in FIG. 6 from which the cartridge member 10' may be formed. Portion 53 of the blank 52 is that portion of the blank which is to be formed into the concave cartridge member and a tab 54 may be formed integrally on portion 53 and a pair of oppositely extending ears 55 extending from the tab. In the finally formed cartridge member 10', tab 54 and ears 55 may be bent to form an integral flame protector 54' for handle 18, the ears 55 being bent upward about the end of the handle adjacent the container. One form of such integral flame protector 54' is shown in FIG. 7. In this form of flame protector, the flame protector spaces the handle 18 from the exterior of the cartridge member 10' and a suitable bolt 20' extends through the cartridge member, flame protector 54' and into the handle 18 for affixing the latter to the unit. It will be seen when considering the embodiment of container shown in FIG. 7, that the infix member 12 not only functions to cover the head 50' of bolt 20', but also defines a continuous rim for the container which might otherwise be broken by the provision of the integral flame protector 54'.

It will be appreciated when considering the above description of the preferred embodiments of the present invention, that various given ones of the above described embodiments may be modified in accordance with the teachings in other ones of the embodiments. For example, the gap 30 between the upstanding side walls of the cartridge and infix members as shown in FIGS. 2 and 3, may be eliminated as shown in the embodiments in FIG. 4, without loss of the many advantages of the replaceable infix member construction of the present invention. In addition, it will also be evident upon consideration of the above described invention, that various materials, metallic or non-metallic, other than the materials previously described, may be utilized in the construction of the cartridge and/or infix members, so long as the particular materials selected display the physical, chemical and biological characteristics which have been explained herein for each of these members. It will also be evident upon consideration of the principles of the invention that methods for removably fixing the cartridge and infix members together other than ring 16 may be employed, such as threading the members directly together or providing projections on one of the members which cooperate with recesses on the other member.

Finally, it should also be understood that the several embodiments of the invention which have been described are merely illustrative of some of the applications of the principles of the invention. Numerous modifications may be made by those skilled in the art without departing from the true spirit and scope of the invention.

What is claimed is:

1. In a cookware unit including a container, said container comprising:
   durable heat conductive cartridge means having heat conductive walls arranged in a predetermined configuration defining a cavity therein which is liquid-free, said walls conducting heat from a heat source to said liquid free cavity,
   infix means also having walls arranged in substantially the same said predetermined configuration and sealingly positioned in the cavity of said cartridge means, said infix means walls also being heat conductive and defining a cavity therein for receipt of the food which is to be prepared in said container, said walls conducting heat to the food from said liquid-free cavity of said cartridge means, the walls of said cartridge means and said infix means being substantially dissimilar in at least one of composition and thickness such that the strength of said cartridge means is substantially greater than the strength of said infix means, and a heat bonded non-stick coating suited for food contact on said infix means coating the food contacting surfaces of said infix means cavity, and
   fastening means attaching said infix means into said liquid free cavity of said cartridge means to thereby define an integral container at all times during cooking use and cleaning of said container, said fastening means together with the walls of said cartridge means and infix means defining sealing means to prevent the passage of matter to and from said liquid free cavity of said cartridge means at all times during cleaning and cooking use of the container, but allowing said durable cartridge means and infix means to be separated when said container is not in use for replacement of said non-stick coated infix means with new infix means when the non-stick coating of said non-stick coated infix means has deteriorated.

2. In the cookware unit of claim 1 wherein said cartridge means and infix means are spaced from each other to define a gap therebetween.

3. In the cookware unit of claim 2 wherein said cartridge means and infix means each include a bottom wall and a side wall extending upward from said bottom wall and said gap is located between the bottom wall of said cartridge means and said infix means, respectively.

4. In the cookware unit of claim 3 including plate means positioned in the gap between and in contact with said bottom walls.

5. In the cookware unit of claim 4 wherein said plate means is a ferrous metal.

6. In the cookware unit of claim 2 wherein at least a portion of said gap comprises a void space.

7. In the cookware unit of claim 2 wherein said cartridge means and infix means each include a bottom wall and a side wall extending upward from said bottom wall, and said gap is located between both said bottom and side walls.

8. In the cookware unit of claim 7 wherein the thickness of said gap differs between said bottom walls and said side walls.

9. In the cookware unit of claim 1 wherein said infix means is aluminum and said coating is a non-stick fluorinated hydrocarbon.

10. In the cookware unit of claim 9 wherein said cartridge means is a ferrous metal.

11. In the cookware unit of claim 1 including stud means welded to the exterior of said cartridge means.

12. In the cookware unit of claim 11 in which said cartridge means and said stud means are a ferrous metal.

13. In the cookware unit of claim 1 wherein said cartridge means is a ferrous metal and a decorative coating coats the exterior of said cartridge means.

14. In the cookware unit of claim 1 wherein said cartridge means is a ferrous metal, said infix means is aluminum and said coating is a fluorinated hydrocarbon, said cartridge means and infix means each include a bottom wall and a side wall, the bottom walls of said cartridge means and infix means being spaced from each other to define a gap therebetween, and heat diffusing means in said gap.

15. In the cookware unit of claim 14 wherein said heat diffusing means comprises a ferrous metal plate of substantially the same size as said bottom walls fixed to the bottom wall of said cartridge means, said infix means resting on said plate.

16. In the cookware unit of claim 14 wherein said side walls are also spaced from each other to define a gap therebetween.

17. In the cookware unit of claim 16 wherein said gaps are of differing thickness.

18. In the cookware unit of claim 1 including handle attachment means having a head thereon, said head being located in a gap between said cartridge means and infix means.

19. In the cookware unit of claim 1 including handle flame protecting and supporting means formed integrally from said cartridge means.

20. In the cookware unit of claim 1 wherein said infix means is non-metallic.

21. In the cookware unit of claim 20 wherein said infix means is fiberglass.

22. In the cookware unit of claim 1 wherein said cartridge means is non-metallic.

23. In the cookware unit of claim 22 wherein said cartridge means is a ceramic.

24. In the cookware unit of claim 1 wherein said durable cartridge means is carbon steel.

25. In the cookware unit of claim 1 wherein said infix means is aluminum or alloys thereof.

26. In the cookware unit of claim 1 wherein said durable cartridge means is metal, and a porcelain enamel coating coated on the exterior thereof.

27. In the cookware unit of claim 1 wherein said durable cartridge means is stainless steel.

28. In the cookware unit of claim 1 wherein said durable cartridge means is aluminum or alloys thereof of substantially greater thickness than the thickness of said infix means.

* * * * *